United States Patent
Ezra et al.

(10) Patent No.: US 11,693,557 B2
(45) Date of Patent: *Jul. 4, 2023

(54) SYSTEMS AND METHODS FOR NON-CONTACTING INTERACTION WITH USER TERMINALS

(71) Applicants: Aron Ezra, Las Vegas, NV (US); Slav Kulik, Mansfield, MA (US)

(72) Inventors: Aron Ezra, Las Vegas, NV (US); Slav Kulik, Mansfield, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/855,962

(22) Filed: Jul. 1, 2022

(65) Prior Publication Data
US 2022/0334713 A1    Oct. 20, 2022

Related U.S. Application Data

(63) Continuation of application No. 17/517,752, filed on Nov. 3, 2021, now Pat. No. 11,409,433, which is a continuation of application No. 17/007,262, filed on Aug. 31, 2020, now Pat. No. 11,194,468.

(60) Provisional application No. 63/022,774, filed on May 11, 2020.

(51) Int. Cl.
| | | |
|---|---|---|
| G06F 3/048 | (2013.01) | |
| G06F 3/04883 | (2022.01) | |
| G06F 3/042 | (2006.01) | |
| G06Q 20/18 | (2012.01) | |
| G07F 19/00 | (2006.01) | |
| G06F 3/0481 | (2022.01) | |
| H04W 4/80 | (2018.01) | |
| G06F 3/01 | (2006.01) | |
| G06F 3/04812 | (2022.01) | |
| G06F 3/0488 | (2022.01) | |
| G06Q 20/10 | (2012.01) | |

(52) U.S. Cl.
CPC .......... *G06F 3/04883* (2013.01); *G06F 3/017* (2013.01); *G06F 3/0425* (2013.01); *G06F 3/0481* (2013.01); *G06F 3/0488* (2013.01); *G06F 3/04812* (2013.01); *G06Q 20/108* (2013.01); *G06Q 20/18* (2013.01); *G07F 19/206* (2013.01); *H04W 4/80* (2018.02); *G06F 2203/04101* (2013.01)

(58) Field of Classification Search
CPC .. G06F 3/04883; G06F 3/0425; G06F 3/0481; G06F 2203/04101; G06Q 20/18; G07F 19/206

See application file for complete search history.

(56) References Cited

U.S. PATENT DOCUMENTS

| | | | |
|---|---|---|---|
| 2013/0241830 A1* | 9/2013 | Ohta | G06F 3/0304 345/158 |
| 2018/0095524 A1* | 4/2018 | Chew | G06F 3/038 |

* cited by examiner

*Primary Examiner* — Lisa S Landis (57) ABSTRACT

Systems and methods are provided to enable users to interact with user terminals having a touch screen interface without requiring the user to physically contact a surface of the touch screen interface.

18 Claims, 11 Drawing Sheets

SYSTEMS AND METHODS FOR NON-CONTACTING INTERACTION WITH USER TERMINALS

CROSS-REFERENCE TO RELATED APPLICATIONS

This application is a continuation of U.S. patent application Ser. No. 17/517,752, filed Nov. 3, 2021, which is a continuation of U.S. patent application Ser. No. 17/007,262, filed Aug. 31, 2020, entitled SYSTEMS AND METHODS FOR NON-CONTACTING INTERACTION WITH USER TERMINALS, issued as U.S. Pat. No. 11,194,468, which claims priority to U.S. patent application Ser. No. 63/022,774, filed May 11, 2020, entitled SYSTEMS AND METHODS FOR NON-CONTACTING INTERACTION WITH TOUCH SCREEN INTERFACES, the disclosures of which are incorporated herein by reference in their entirety.

BACKGROUND

Touch screen interfaces are becoming ubiquitous as they are increasingly incorporated into a wide variety of devices. Example devices that include touch screen interfaces are ATMs, kiosks, elevator touch panels, point of sale terminals, airport check-in kiosks, supermarket self-check-out terminals, vending machines, gas pumps, casino games, in-restaurant ordering devices, ticket dispensers, employee kiosks, health assessment kiosks, wayfinding and general information kiosks, and paid parking machines, among numerous others. A vast majority of such devices are in public places and are routinely touched by large volumes of people. Users are becoming increasingly concerned with the possible exchange of bacteria, germs, viruses, and other contagions through physical interaction with commonly touched surfaces, including touch screen interface surfaces. Touch screen interfaces are rarely, if ever, disinfected, sanitized, or even cleaned. While other user input technologies, such as voice control, may allow at least some degree of contactless interaction with certain devices, these technologies are often not practical to implement nor do they provide an acceptable level of usability.

BRIEF DESCRIPTION OF THE DRAWINGS

The present disclosure will be more readily understood from a detailed description of some example embodiments taken in conjunction with the following figures.

DETAILED DESCRIPTION

Various non-limiting embodiments of the present disclosure will now be described to provide an overall understanding of the principles of the structure, function, and use of the systems and methods as disclosed herein. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term software is used expansively to include not only executable code, but also data structures, data stores, and computing instructions in any electronic format, firmware, and embedded software. The terms information and data are used expansively and can include a wide variety of electronic information, including but not limited to machine-executable or machine-interpretable instructions; content such as text, video data, and audio data, among others; and various codes or flags. The terms information, data, and content are sometimes used interchangeably when permitted by context.

The examples discussed herein are examples only and are provided to assist in the explanation of the systems and methods described herein. None of the features or components shown in the drawings or discussed below should be taken as mandatory for any specific implementation of any of these systems and methods unless specifically designated as mandatory. For ease of reading and clarity, certain components, modules, or methods may be described solely in connection with a specific figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

In accordance with various embodiments, the presently disclosed systems and methods generally enable users to interact with user terminals having a touch screen interface without requiring the user to physically contact a surface of the touch screen interface. As used herein, "user terminal" broadly refers to any system, device, or component that incorporates a touch screen interface as a means for user input. Examples of user terminals include, but are not limited to, ATMs, kiosks, casino games, elevator touch panels, point of sale (POS) terminals, gas pumps, airport check-in kiosks, supermarket self-check-out terminals, vending machines, in-restaurant ordering devices, ticket dispensers, employee kiosks, health assessment kiosks, and wayfinding and general information kiosks. Accordingly, user terminals in accordance with the present disclosure can have a wide variety of form factors and utilize a variety of different types of touch screen interfaces and/or other forms of user input interfaces requiring physical contact by a user.

As described in more detail below, the presently disclosed systems and methods allow a user to interact with a user terminal through non-contacting interactions. In some embodiments, for example, a user can have non-contacting interactions with a touch screen interface of a user terminal through a series of hand gestures. In other embodiments, a user can have non-contacting interactions with a touch screen interface of a user terminal through contacting interactions with the user's mobile communication device. The user's interactions with their mobile communications device can be relayed to the user terminal through network communications. Furthermore, in some embodiments, such contactless interaction functionality can be provided as a retrofit kit or add-on system that is incorporated into an existing user terminal, although this disclosure is not so limited.

Figure 1:
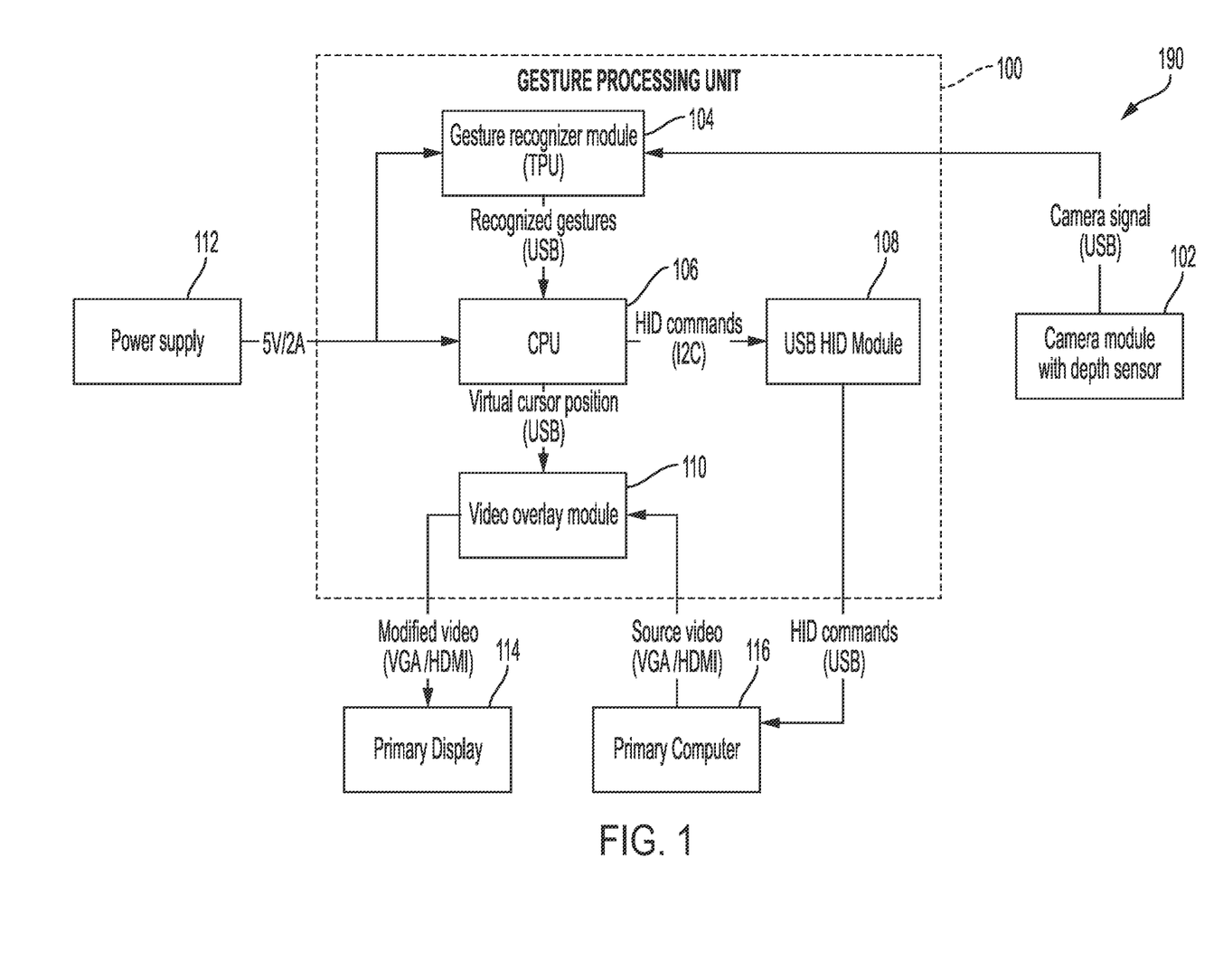
FIG. 1 depicts an example gesture processing unit in accordance with one non-limiting embodiment.

Referring now to FIG. 1, an example gesture processing unit 100 is depicted in accordance with one non-limiting embodiment. The gesture processing unit 100 can be incorporated into an existing user terminal 190 in order to provide non-contact inputs from a user. In some embodiments, for example, the gesture processing unit 100 is positioned internal to a housing, case, or cabinet of the user terminal 190. The user terminal can have an existing power supply 112, a primary display 114, and a primary computer 116. The primary display 114 can incorporate a touch screen interface that is used to track a user's physical interaction with the surface of the interface. Additionally or alternatively, the user terminal 190 may have other forms of input devices, such as a numeric keypad, a mouse, a stylus, a keyboard, push buttons, and so forth. The gesture processing unit 100 can allow a user to provide inputs to the user terminal 190 through non-contacting hand gestures and without requiring physical contact with any surfaces of the user terminal 190.

Such hand gestures can be executed within the field of view of a camera 102 that is mounted to the user terminal 190. In some embodiments, the gesture processing unit 100 can utilize a video feed from an existing camera 102 that was installed in the user terminal 190 at the time of manufacture. In other embodiments, the user terminal 190 may not include a camera 102, or the in-situ camera is not suitable for the needs of the gesture processing unit 100. In such embodiments a camera 102 can be mounted to the user terminal 190 at the time the gesture processing unit 100 is installed. The camera 102 can be a depth sensor camera as depicted, or any other any suitable type of camera. Furthermore, in some embodiments, the user terminal 190 may have multiple cameras 102.

The gesture processing unit 100 can be connected to the peripheral modules of the user terminal 190. In accordance with various embodiments, the gesture processing unit 100 can have inputs for HDMI/VGA, Bluetooth/WiFi communications, and USB devices, and outputs for HDMI/VGA and USB, for example. When installed in the user terminal 190, the gesture processing unit 100 can be treated as a peripheral device by the other computers of the user terminal 190.

The gesture processing unit 100 can be connected to the primary computer 116 of the user terminal 190 via USB port to provide users with a touchless approach for interacting with the user terminal 190. As such, a user can interact with the user terminal 190 without being required to physically touch an input device of the user terminal (such as a keyboard, a mouse, a touchscreen, a keypad, and so forth). Additionally, a video stream can be routed from the primary computer 116 to the gesture processing unit 100 by connecting HDMI/VGA output from the primary computer 116 to an input port in the gesture processing unit 100. The primary display 114 of the user terminal 190 can be connected to the output HDMI/VGA port on the gesture processing unit 100.

In an idle state, the original video feed from the primary computer 116 can be proxied via the gesture processing unit 100, unaltered, and then displayed on the primary display 114. An application executed by a CPU 106 of the gesture processing unit 100 can actively monitor motion via the connected depth camera 102. In some embodiments, a gesture recognizer module 104 using a tensor processing unit (TPU) is utilized, although this disclosure is not so limited. Upon the identification of an "initiate" gesture by a user of the user terminal 190, for example, the CPU 106 can begin to overlay the original video with a semi-transparent image of a cursor by a video overlay module 110 to aid the user in navigation.

During a user's contactless interaction with the user terminal 190, relevant gestures can be identified and translated to the equivalent human interface device (HID) commands by an HID module 108 of the gesture processing unit 100. The commands can be delivered to the primary computer 116 via USB connection (or other suitable communications), while the video feed overlay module 110 can provide a user of the user terminal 190 with visual feedback for each relevant action on the primary display 114. By way of non-limiting examples, gestures of the user can cause the cursor to point to various interactive elements on the screen that would typically be physically touched by a user. When the cursor is pointing to a desired interactive element, the user can execute a gesture for selecting or activating the interactive element.

Figure 2:
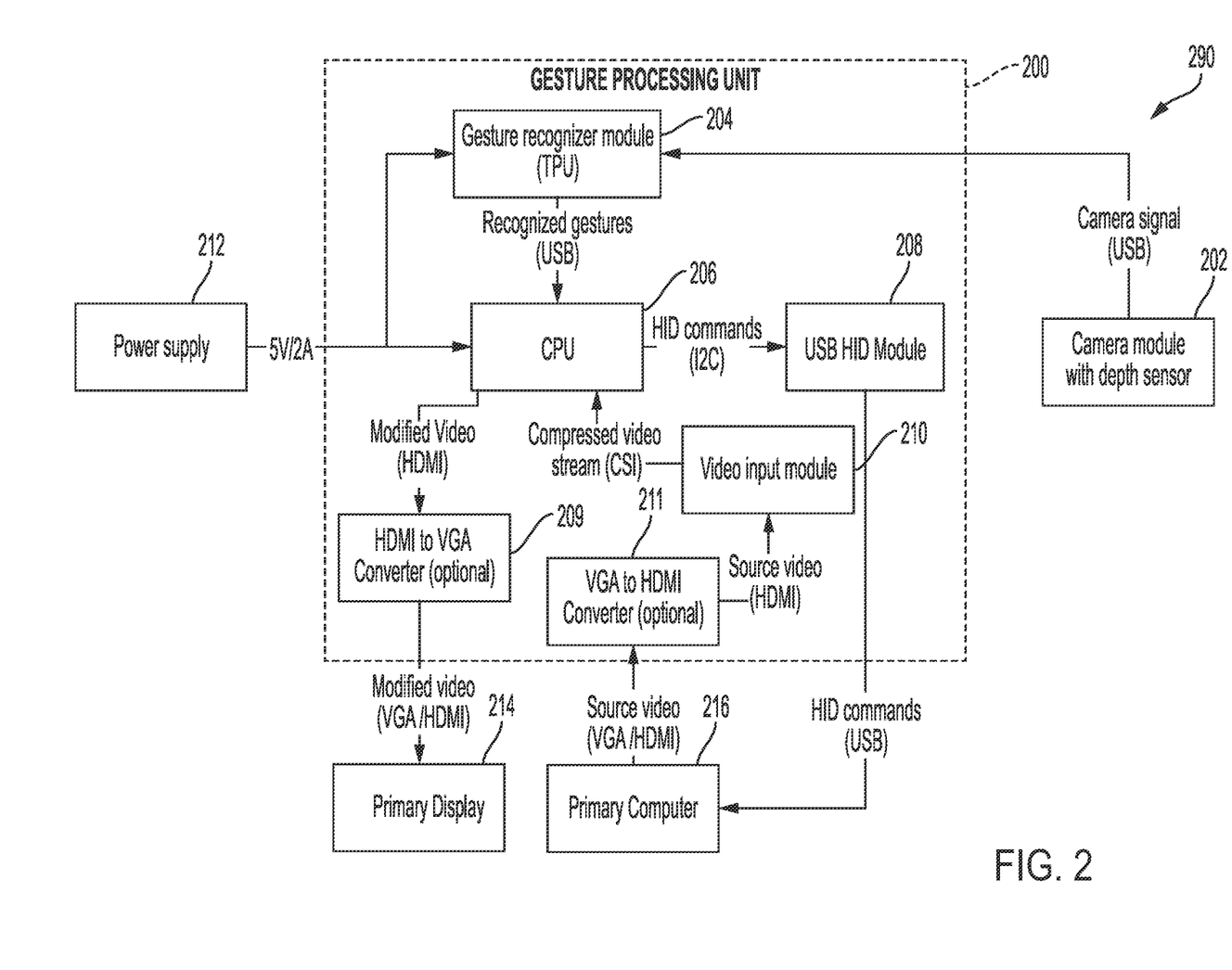
FIG. 2 depicts another example gesture processing unit in accordance with one non-limiting embodiment.

Referring now to FIG. 2, another example of a gesture processing unit 200 is depicted in accordance with one non-limiting embodiment. Similar to FIG. 1, the gesture processing unit 200 can be incorporated into an existing user terminal 290 in order to provide non-contact inputs from a user. The user terminal can have an existing power supply 212, a primary display 214, and a primary computer 216. The primary display 214 can incorporate a touch screen interface that is used to track a user's physical interaction with the surface of the interface. Additionally or alternatively, the user terminal 290 may have other forms of input devices, such as a numeric keypad, a mouse, a stylus, a keyboard, push buttons, and so forth. The gesture processing unit 200 can allow a user to provide inputs to the user terminal 290 through non-contacting hand gestures and without requiring physical contact with any surfaces of the user terminal 290. Such hand gestures can be executed within the field of view of camera 202 that is mounted to the user terminal 290. The camera 202 can be a depth sensor camera as depicted, or any other suitable type of camera. Furthermore, in some embodiments, multiple cameras 202 can be utilized.

The gesture processing unit 200 can be connected to the peripheral modules of the user terminal 290. In accordance with various embodiments, the gesture processing unit 200 can have inputs for HDMI/VGA, Bluetooth/WiFi communications, and USB devices, and outputs for HDMI/VGA and USB, for example. When installed in the user terminal 290, the gesture processing unit 200 can be treated as a peripheral device by the other computers of the user terminal 290.

Similar to the gesture processing unit 100 of FIG. 1, the gesture processing unit 200 can be connected to the primary computer 216 of the user terminal 290 via USB port to provide users with a touchless approach for interacting with the user terminal 290. Additionally, a video stream can be routed from the primary computer 216 to the gesture processing unit 200 by feeding the video output from the primary computer 216 to an input port in the gesture processing unit 200. In some embodiments, a VGA to HDMI converter 211 can be used to convert the source video. As shown, a video input module 210 can be used to compress the video and provide the compressed video to the CPU 206 via a camera serial interface (CSI) bus, for example. The primary display 214 of the user terminal 290 can be connected to the output HDMI/VGA port on the gesture processing unit 100. As shown, an HDMI to VGA converter 209 can be used to output video prior to feeding it to the primary display 214.

In an idle state, the original video feed from the primary computer 216 can be proxied via the gesture processing unit 200, unaltered, and then displayed on the primary display 214. An application executed by the CPU 206 of the gesture processing unit 200 can actively monitor motion via the connected camera 202. In some embodiments, a gesture recognizer module 204 using a tensor processing unit (TPU) is utilized, although this disclosure is not so limited. Upon identifying an "initiate" gesture by a user of the user terminal 290, for example, the CPU 206 can begin to overlay the original video with a semi-transparent image of a cursor by a video overlay module 210 to aid the user in navigation.

During a user's contactless interaction with the user terminal 290, relevant gestures can be identified and translated to the equivalent human interface device (HID) commands by an HID module 208 of the gesture processing unit 200. The commands can be delivered to the primary computer 216 via USB connection (or other suitable communications). The CPU 206 can also modify the video feed such that visual feedback for each relevant action on the primary display 214. By way of non-limiting examples, gestures of the user can cause the cursor to point to various interactive elements on the screen that would typically be physically touched by a user. When the cursor is pointing to a desired interactive element, the user can execute a gesture for selecting or activating the interactive element.

Figure 3:
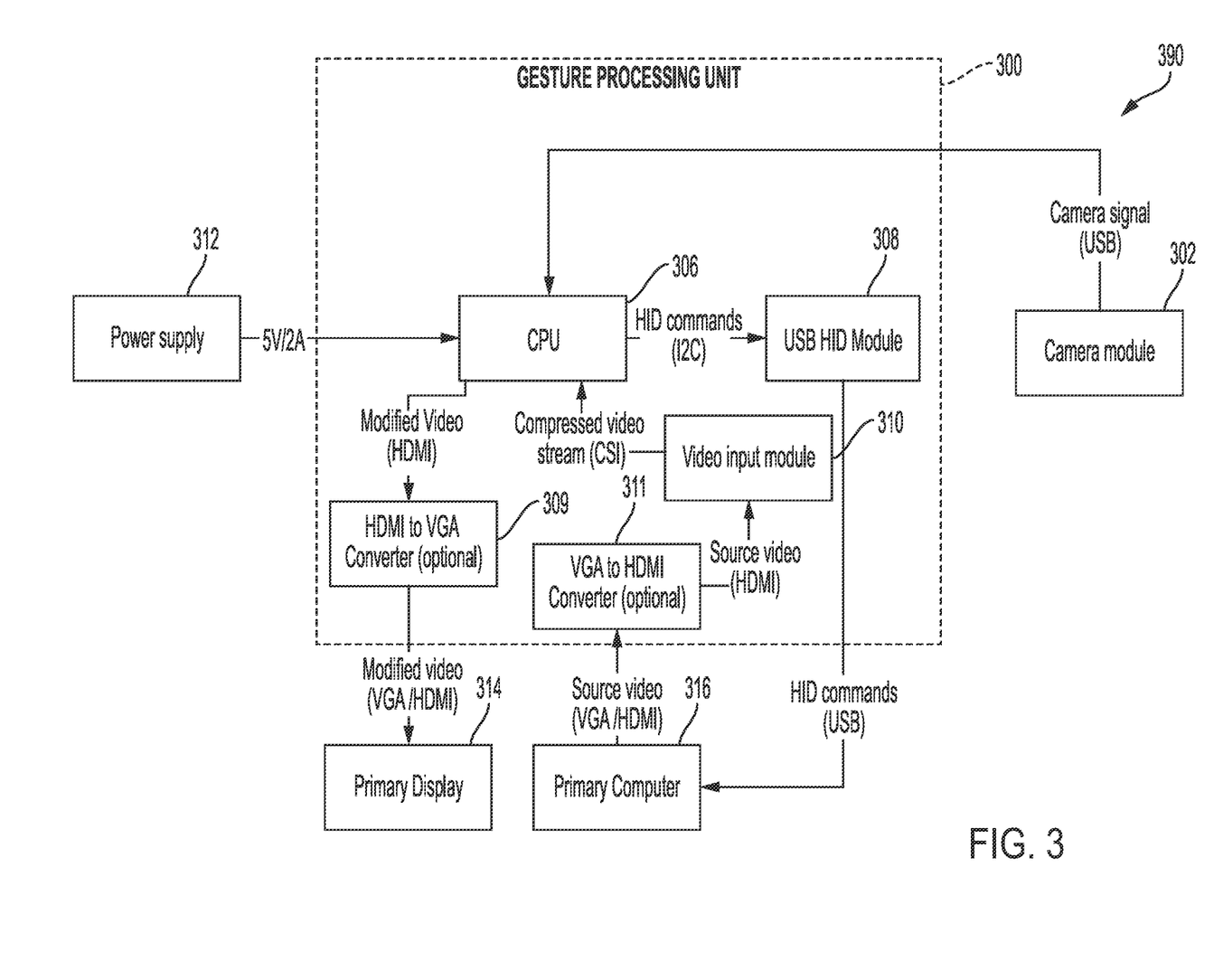
FIG. 3 depicts yet another example gesture processing unit in accordance with one non-limiting embodiment.

FIG. 3 depicts another example of a gesture processing unit 300 in accordance with one non-limiting embodiment. Similar to FIG. 2, the gesture processing unit 300 can be incorporated into an existing user terminal 390 in order to provide non-contact inputs from a user. The user terminal can have an existing power supply 312, a primary display 314, and a primary computer 316. The user terminal 390 can also have a camera 302. The gesture processing unit 300 can be similar to the gesture processing unit 200 (FIG. 2), having a CPU 306, and an HID module 308. In some embodiments, the gesture processing unit 300 can also include a video input module 310, a VGA to HDMI converter 311, and a HDMI to VGA converter 309, although this disclosure is not so limited. This example embodiment of the gesture processing unit 300 does not necessarily utilize a tensor processing unit (TPU) for gesture recognition. In other embodiments, however, the CPU 306 can include a TPU without departing from the scope of the present disclosure. As shown in FIG. 3, the camera signal is fed to the CPU 306 processing. In some embodiments, the camera module 302 can include a depth sensor such that the camera signal provided to the CPU 306 includes depth information. Providing depth information in the camera signal can increase the ability of the CPU 306 to provide real-time gesture processing without necessarily needing a TPU. Thus, the functionality provided by the gesture processing unit 300 can be similar to the functionality provided by the gesture processing unit 200, but without the need for dedicated TPU.

Figure 4:
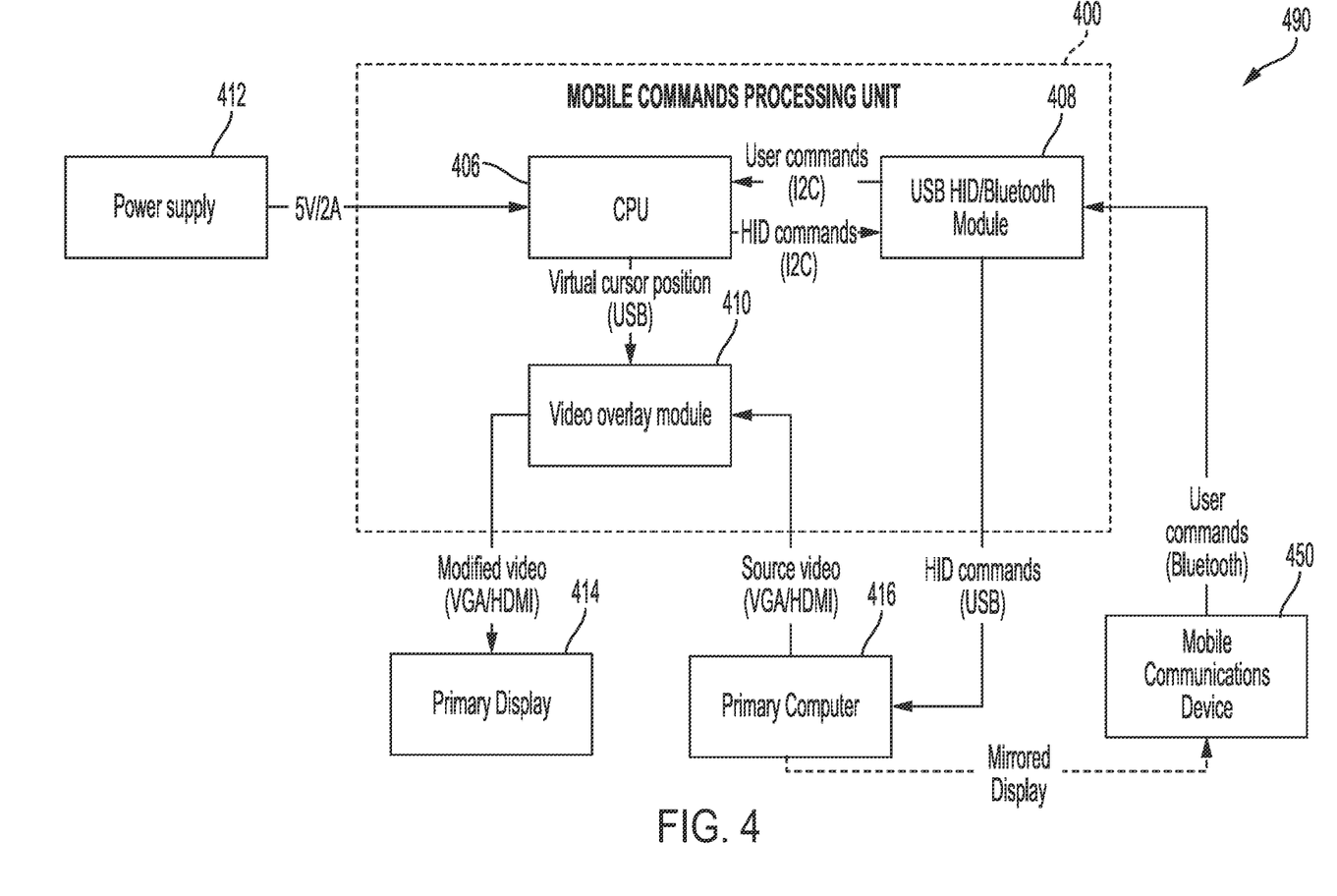
FIG. 4 depicts an example mobile commands processing unit in accordance with one non-limiting embodiment that enables contactless interaction with a user terminal via a mobile communications device.

Referring now to FIG. 4, a mobile commands processing unit 400 is depicted in accordance with one non-limiting embodiment that enables contactless interaction with a user terminal 490 via a mobile communications device 450. Similar to the gesture processing units 100, 200 and 300, the mobile commands processing unit 400 can be integrated into an existing user terminal 490. Generally, the mobile commands processing unit 400 can serve to mirror the images presented on a primary display 414 of the user terminal 490 onto a display screen of mobile communications device 450 via wireless communications, as schematically depicted in FIG. 4. The user can interact with their mobile communications device 450 (i.e., via touching the display screen) and such interactions are relayed to the user terminal 490.

The user terminal 490 can have a power supply 412, a primary display 414, and a primary computer 416, similar to the user terminal 190, 290, 390, described above, for example. Similar to the gesture processing units 100, 200, 300, for example, the mobile commands processing unit 400 can have a CPU 406 and a video overlay module 410. In accordance with various embodiments, the mobile commands processing unit 400 can have inputs for HDMI/VGA, Bluetooth/WiFi communications, and USB devices, and outputs for HDMI/VGA and USB, for example. When installed in the user terminal 490, the mobile commands processing unit 400 can be treated as a peripheral device by the other computers of the user terminal 490. Furthermore, while the embodiment depicted in FIG. 4, as well as other embodiments, depict the use of Bluetooth for the purposes of illustration, it is to be appreciated that any suitable short-range wireless communication protocol and/or technologies can be used without departing from the scope of the present disclosure.

The mobile commands processing unit 400 can be connected to a primary computer 416 of the user terminal 490 via USB port to provide users with a touchless approach for interacting with the user terminal 490. Additionally, a video stream can be routed from the primary computer 416 to the mobile commands processing unit 400 by connecting HDMI/VGA output from the primary computer 416 to an input port of the mobile commands processing unit 400. The primary display 414 of the user terminal 490 can be connected to the output HDMI/VGA port on the mobile commands processing unit 400. In this embodiment, a HID/Bluetooth module 408 is utilized to communicate with a mobile communications device 450. As is to be appreciated, the mobile communications device 450 can be a smart phone, a wearable (i.e., smart watch), tablet computer, laptop computer, or any other suitable device with a screen and that can receive user input.

In the idle state, the original video feed from the primary computer 416 can be proxied via the mobile commands processing unit 400, unaltered, and then displayed on the primary display 414. An application running on the CPU 406 of the mobile commands processing unit 400 can actively monitor user connections. After establishing a secure connection with the mobile communications device 450, the display that would conventionally be displayed on the primary display 414 can be displayed on the mobile communications device 450 instead. Once successfully mirrored, the video display of the primary display 414 can operationally display, for example, the identical content that is displayed on the mobile communication device 450. Alternatively, in some embodiments, other content can be provided for display on the primary display 414, such as an advertisement/marketing materials, or a variety of other suitable communications or messages. In other embodiments, the primary display 414 may be blank.

Once mirroring is complete, users can use their mobile communications device 450 as a touchpad, and the HID/Bluetooth Module 408 of the mobile commands processing unit 400 can translate such interaction to the equivalent HID (human interface device) commands. The HID/Bluetooth Module 408 can deliver the commands to the primary computer 416 via USB connection. In some embodiments, the video feed overlay module 410 can provide a user with a visual feedback of each relevant action.

The mobile communication device 450 can be paired to the user terminal 490 via any suitable technique. In one example embodiment, the CPU 406 can cause a QR code to be displayed on the primary display 414. The user of the user terminal 490 can capture the QR code with a camera of the mobile communications device 450. Capturing the QR code can initiate a secure Bluetooth connection between the mobile communications device 450 and the HID/Bluetooth module 408 of the mobile commands processing unit 400. Furthermore, the images presented on the display screen of the mobile communications device 450 can be replicas of the images that would be presented on the primary display 414. In some embodiments, however, the images presented on the display screen of the mobile communications device 450 can be modified, customized, or otherwise adjusted for proper display on the mobile communications device 450.

Figure 5:
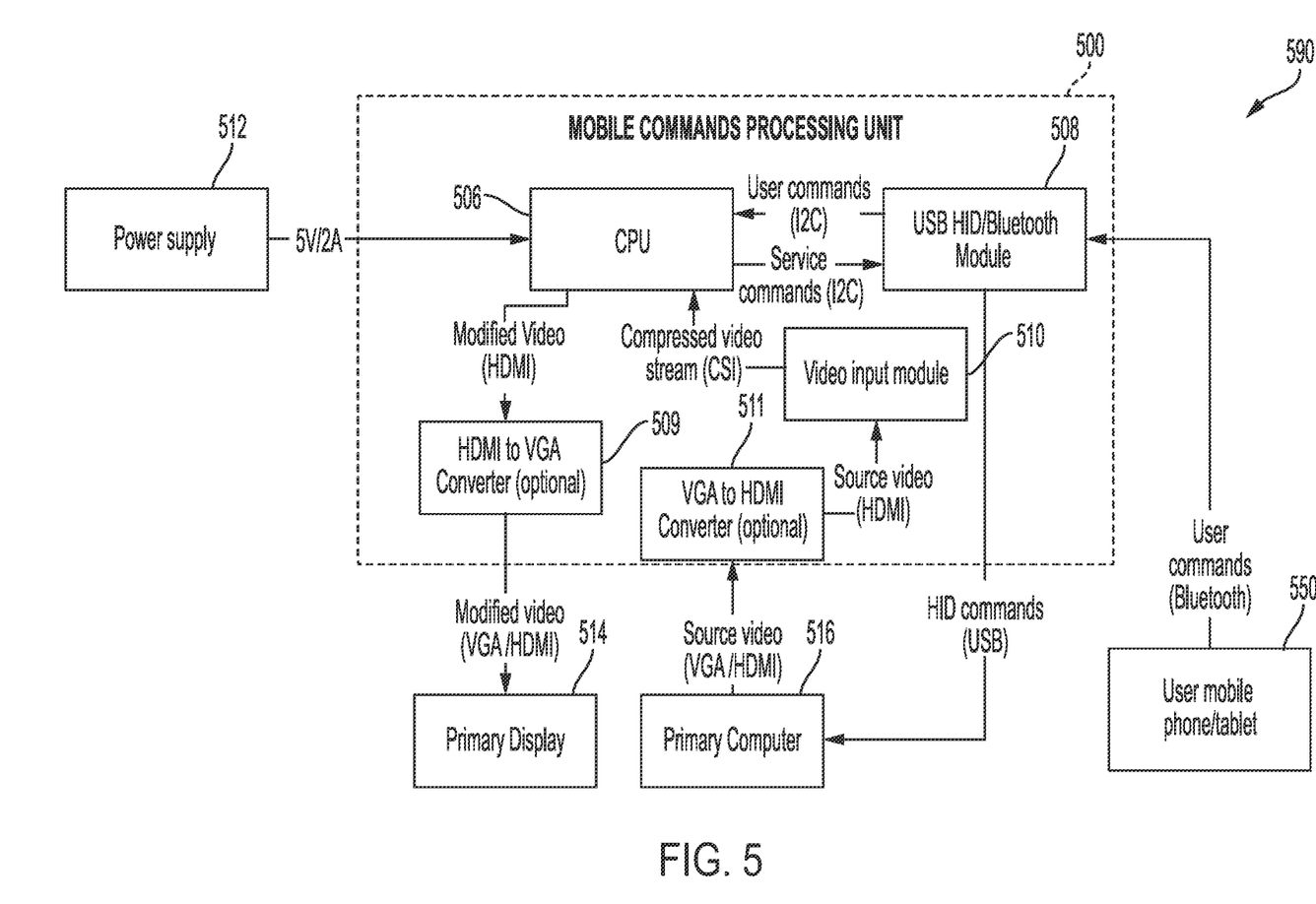
FIG. 5 depicts another mobile commands processing unit in accordance with one non-limiting embodiment that enables contactless interaction with a user terminal via a mobile communications device

FIG. 5 depicts another example mobile commands processing unit 500 in accordance with one non-limiting embodiment. Similar to FIG. 4, the mobile commands processing unit 500 can be incorporated into an existing user terminal 590 in order to provide non-contact inputs from a user. The user terminal can have an existing power supply 512, a primary display 514, and a primary computer 516.

The mobile commands processing unit 500 can be similar to the mobile commands processing unit 400 (FIG. 4), having a CPU 506, and an HID module 508. In some embodiments, the mobile commands processing unit 500 can also include a video input module 510, a VGA to HDMI converter 511, and a HDMI to VGA converter 509, although this disclosure is not so limited. This embodiment of the gesture processing unit 300 does not utilize, however, a tensor processing unit (TPU) for gesture recognition.

The functionality provided by the mobile commands processing unit 500 can be similar to the functionality described above with regard to mobile commands processing unit 400. In one example embodiment, for example, a user can approach the user terminal 590 and open a specific mobile application on their mobile communications device 550. The mobile application can finds the user terminal 590 via Bluetooth connection, for example, and attempt to connect. If the connection was successful, in accordance with some embodiments, the application executing on the mobile communications device 550 can provide the user with a choice of mirror mode or touchpad mode.

If the mirror mode is selected, the mobile application can display, for example, a viewfinder box on the screen of the mobile communications device 550. The size of the viewfinder box can have the same aspect ratio as the primary display 514 user terminal 590, for example. The user can point a rear-facing camera of mobile communications device 550 towards the primary display 514, such that the camera feed is displayed in the viewfinder box. The user can then interact with the display of the mobile communications device 550 (by touching a location in the viewfinder box that is displaying an interactive element from the primary display, for example). These interactions with the touchscreen of the mobile communications device 550 can be sent to the mobile commands processing unit 500 and can be translated to coordinates on the primary display 514. Based on the user's interaction with the touchscreen of their mobile communications device 550 the HID module 508 can send corresponding commands to the primary computer 516.

If the touchpad mode is selected, the mobile application can present a virtual track pad panel on the touchscreen on the mobile communications device 550, similar in functionality to a touchpad on a laptop computer, for example. The mobile application of the mobile communications device 550 can process user interaction (taps, moves and swipes) with the virtual track pad panel and send them via the Bluetooth connection to the HID module 508, for example. The HID module 508 can then send the actions to the primary computer 516 user terminal 590 of the via standard HID protocol. The HID module 508 can also sends the actions and to the CPU 506 via I2C connection, for example.

Figure 6:
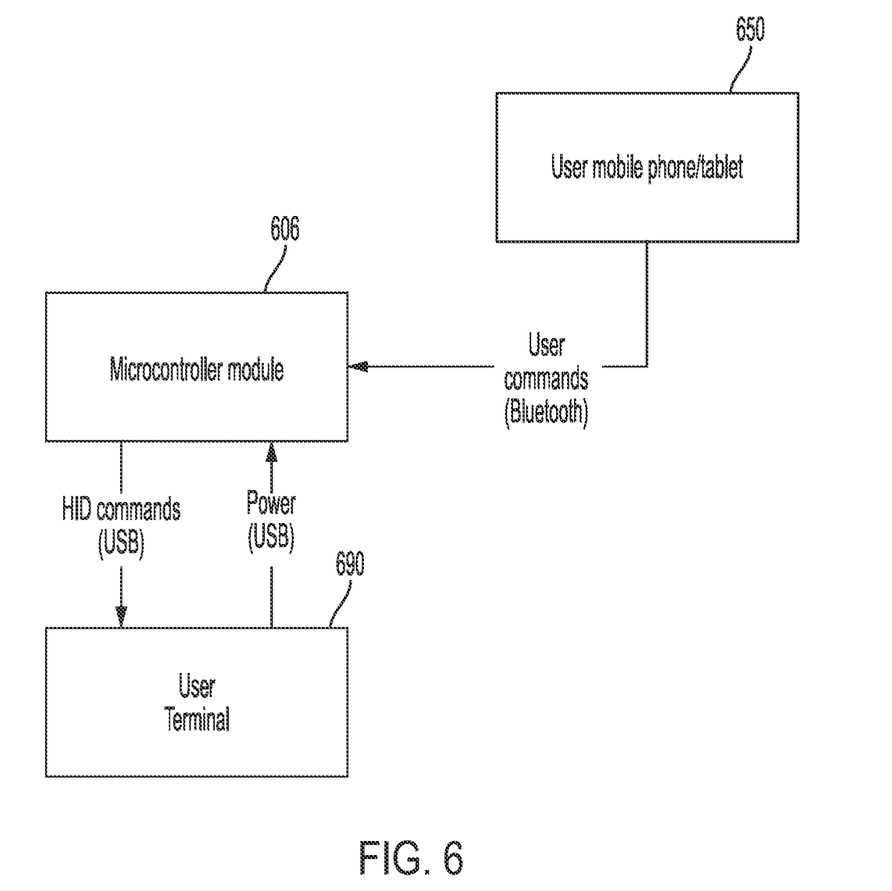
FIG. 6 depicts another example embodiment of contactless control of a user terminal in accordance with one non-limiting embodiment.

Referring now to FIG. 6, an example embodiment of contactless control of a user terminal 690 is depicted. In this embodiment, the user can interact with their mobile communication device 650 to control a mouse or pointer on a screen of the user terminal 690, similar to the "touchpad mode" described above, for example. More specifically, the touchscreen of their mobile communication device 650 can serve as track pad such that as a user moves their finger along the touchscreen of their mobile communication device 650, they will see the pointer on the device screen move in parallel. When the user taps or double-taps the touchscreen of the their mobile communication device 650, it would register on the device screen as a "touch" or "click", or other suitable action, on the user terminal 690.

Similar to FIG. 4, a microcontroller module 606 can include a USB HID/Bluetooth and/or WiFi Module. The user can connect their mobile communication device 650 to the microcontroller module 606 via suitable communication protocol and connection process. An application running on the microcontroller module 606 can actively monitor users. Users can use the connected mobile communication device 650 as a touchpad, and the microcontroller module 606 can translate such interaction to the equivalent HID (human interface device) commands and deliver the HID commands to the primary computer of the user terminal 690 via USB connection. Thus, a cursor provided by the operating system of the user terminal 690 can be controlled by the user through the interaction with the connected mobile communication device 650 without requiring the user to physically contact the user terminal 690.

Figure 7:
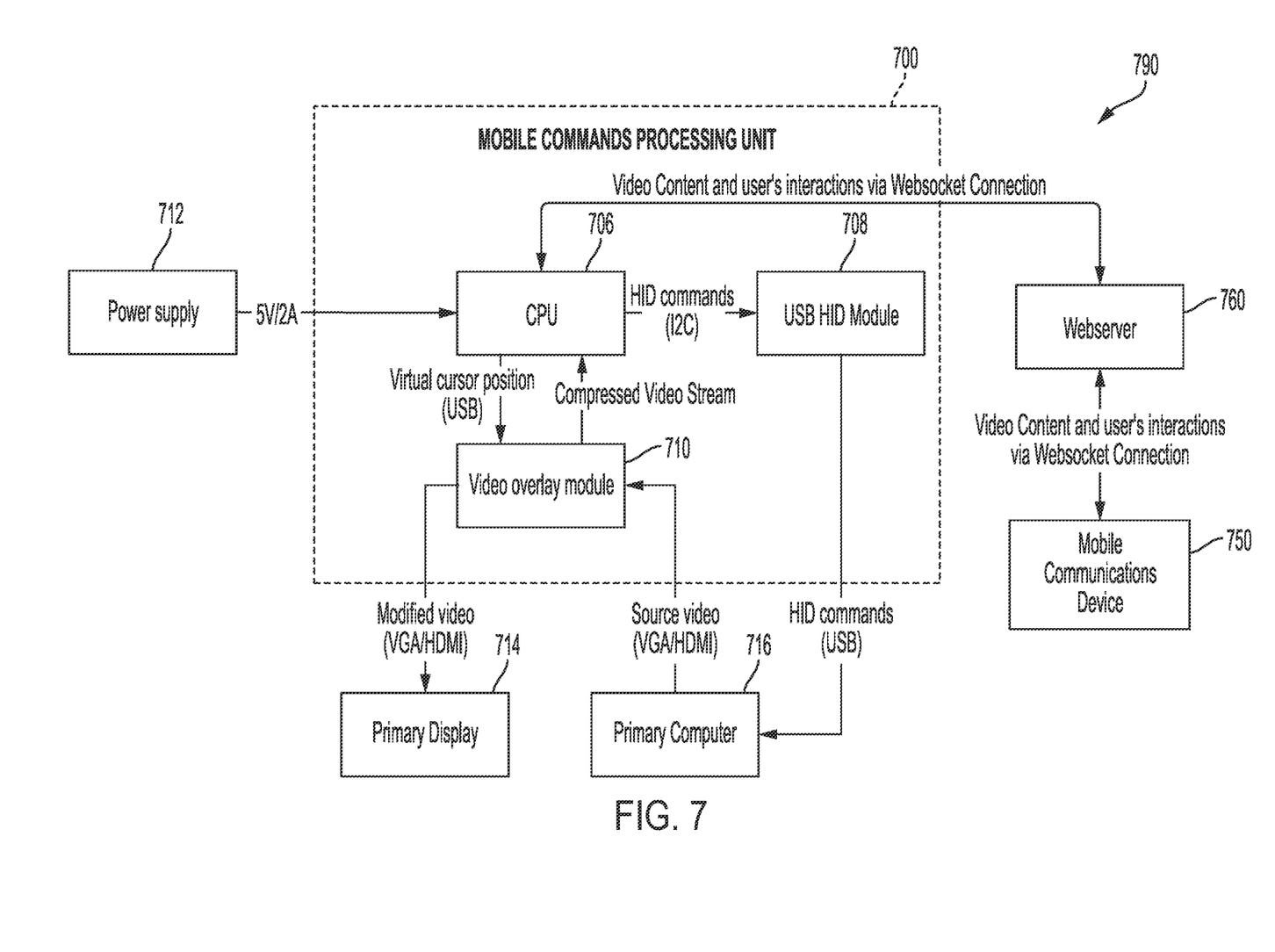
FIG. 7 depicts an example Internet-based mobile commands processing unit in accordance with one non-limiting embodiment.

Referring now to FIG. 7, an example Internet-based mobile commands processing unit 700 is depicted in accordance with one non-limiting embodiment. Generally, the mobile commands processing unit 700 can be a retrofit kit that can establish a bi-directional connection between a mobile communications device 750 and a user terminal 790 via a websocket protocol. Thus, instead of using a direct Bluetooth connection or a WiFi connection between the mobile communications device 750 and the user terminal 790, a dedicated, secure bi-directional connection between the mobile communications device 750 and the user terminal 790 can be established. Using this technique for contactless interaction, the user could either see a broadcast version of the screen of the user terminal 790 (similar to FIG. 4, for example) or the user could instead simply use their mobile communications device 750 as a touchpad to interact with the screen of user terminal 790 (similar to FIG. 6, for example).

The user terminal 790 can be similar to user terminals 190, 490, and 690 having a power supply 712, a primary display 714, and a primary computer 716. The mobile commands processing unit 700 can be similar to the mobile commands processing unit 200 of FIG. 4, having a CPU 706, video overlay module 710, and an HID module 708.

When a user approaches the user terminal 790 in its idle state, an application running on the CPU 706 can display an overlay message directing the user to navigate to a specific website address on their mobile communications device 750. The primary display 714 can also show a unique QR code (or other unique identifier) displayed next to the message. The user can then navigate to the website address on their mobile communications device 750 and be prompted to scan the currently displayed QR code from the primary display 714, or otherwise enter the unique identifier. For example, in some embodiments, a unique alphanumeric code can be displayed on the primary display 714 of the user terminal 790 that can be typed into the webpage displayed on the mobile communications device 750. Once the unique code is entered, a dedicated websocket connection can be established between the mobile communications device 750 and the user terminal 790 through a webserver 760. The primary display 714 of the user terminal 790 can be set to display alternative content, display a black screen, or display a message that private connection in session, for example.

In accordance with various embodiments, the mobile commands processing unit 700 can utilize a video compression algorithm and only send static images of the screen to the mobile communications device 750 to minimize the latency and reduce the required bandwidth. The website presented at the mobile communications device 750 can capture the user's interactions and send them to the web server 760, which in turn sends them to the mobile commands processing unit 700. The mobile commands processing unit 700 can translate such interactions to the HID command, which is delivered via USB port to the user terminal 790.

Although FIG. 7, and other embodiments described herein (such as FIG. 11, below) depict the use of the websocket protocol for illustration purposes, this disclosure is not so limited. Instead, any suitable web-based communication protocol, or combination of multiple web-based communication protocols can be utilized without departing from the scope of the present disclosure. By way of non-limiting examples, some embodiments of the present disclosure can utilize a RTP Control Protocol (RTCP), an HTTP Live Streaming (HLS) protocol, among others. Further, some embodiments can utilize, for example, an HLS protocol for video transmission and a websocket protocol for gesture input transmission.

Figure 8:
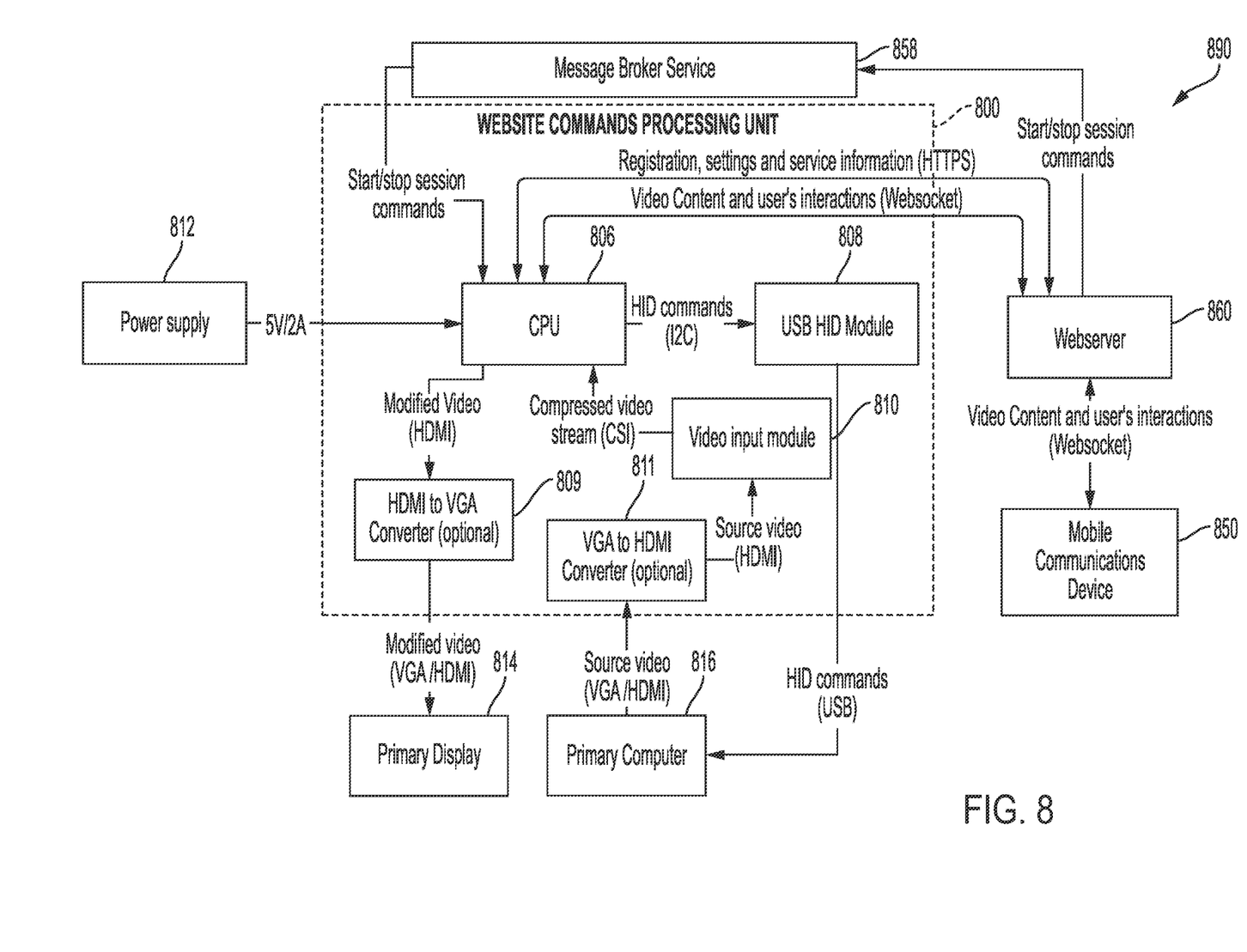
FIG. 8 depicts another example Internet-based mobile commands processing unit in accordance with one non-limiting embodiment.

FIG. 8 depicts another example mobile commands processing unit 800 in accordance with one non-limiting embodiment. Similar to FIG. 7, the mobile commands processing unit 800 can be incorporated into an existing user terminal 890 in order to provide non-contact inputs from a user. The user terminal can have an existing power supply 812, a primary display 814, and a primary computer 816. The mobile commands processing unit 800 can be similar to the mobile commands processing unit 700 (FIG. 7), having a CPU 806, and an HID module 808. In some embodiments, the mobile commands processing unit 800 can also include a video input module 810, a VGA to HDMI converter 811, and a HDMI to VGA converter 809, although this disclosure is not so limited.

In accordance with one example implementation, a user can scans a QR Code with a mobile communications device 850. The QR code can be associated with the user terminal 890 (i.e. via a unique identifier of the user terminal) and direct a browser of the mobile communications device 850 to a website when scanned. The website can send the command to the CPU 806 to generate and show the start session QR code. This command can be sent via a message broker service 858, such as AWS SQS, for example. The CPU 806 can cause a "start-session QR code" to be presented on the primary display 814 via video overlay. The mobile communications device 850 can scan the "start-session QR code" presented on the primary display 814 using a QR code scanner. In some embodiments, the QR Code scanner is provided by the website interface.

The website can then send the command to the CPU 806 to start the session. This command is sent via the message broker service 858, for example. Once the session is started, the CPU 806 can remove the start-session QR code from the primary display 814 and start sending frames with original images of the primary display 814 to the website via a websocket connection. In some embodiments, the frames are jpeg images, which form an mjpeg stream. The website can show these frames to a user of the mobile communications device 850. The website can registers the user's taps, moves, or other interactions with the screen and send them to the CPU 806 via opened websocket connection stablished between the mobile communications device 850 and the user terminal 890 through a webserver 860.

The CPU 806 can receive the coordinates of the user interactions from the websocket connection and send them to the USB HID Module 808 via an I2C connection. The USB HID module 808 can receives the coordinates of the user interactions and send them to the primary computer 816 via standard HID protocol.

Figure 9:
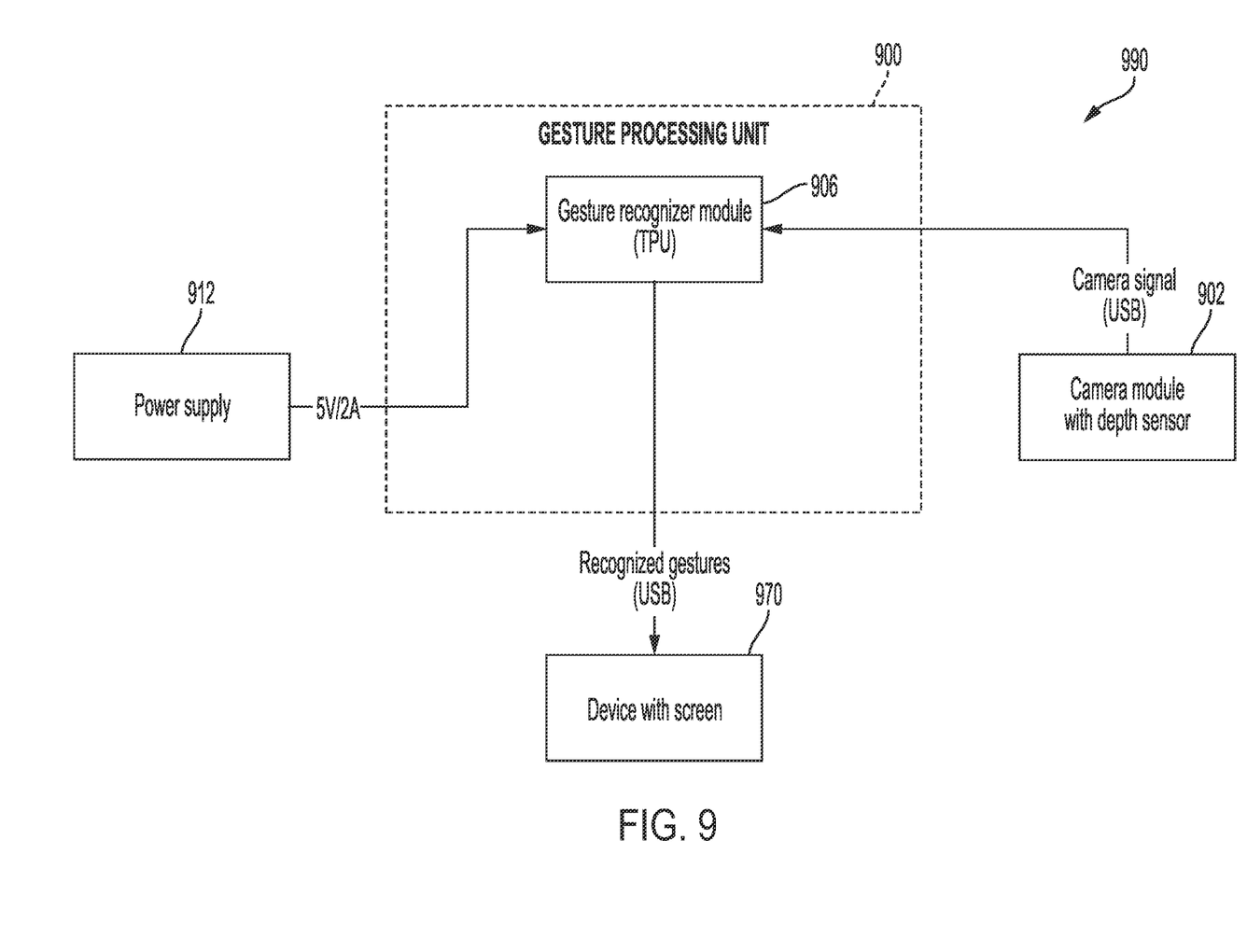
FIG. 9 depicts a user terminal that includes a built-in gesture processing unit in accordance with one non-limiting embodiment.
Figure 10:
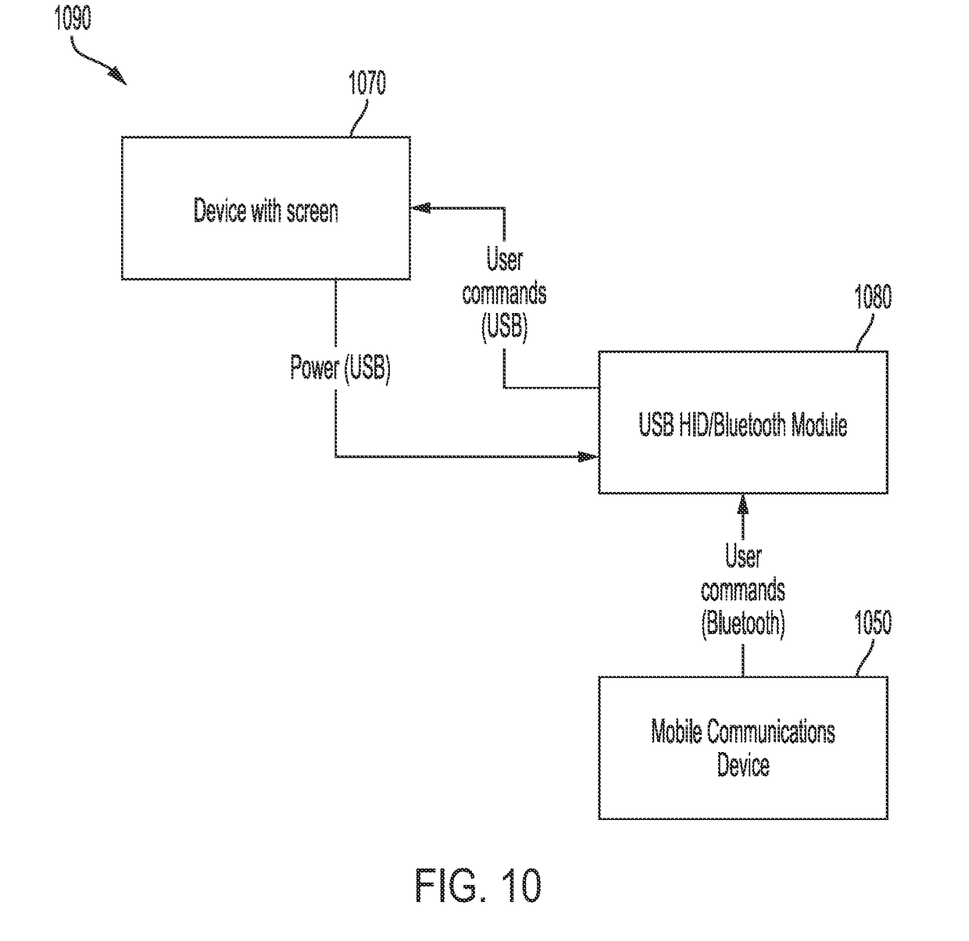
FIG. 10 depicts a user terminal that includes a built-in HID/Bluetooth module allowing for user input from a coupled mobile communications device in accordance with one non-limiting embodiment.
Figure 11:
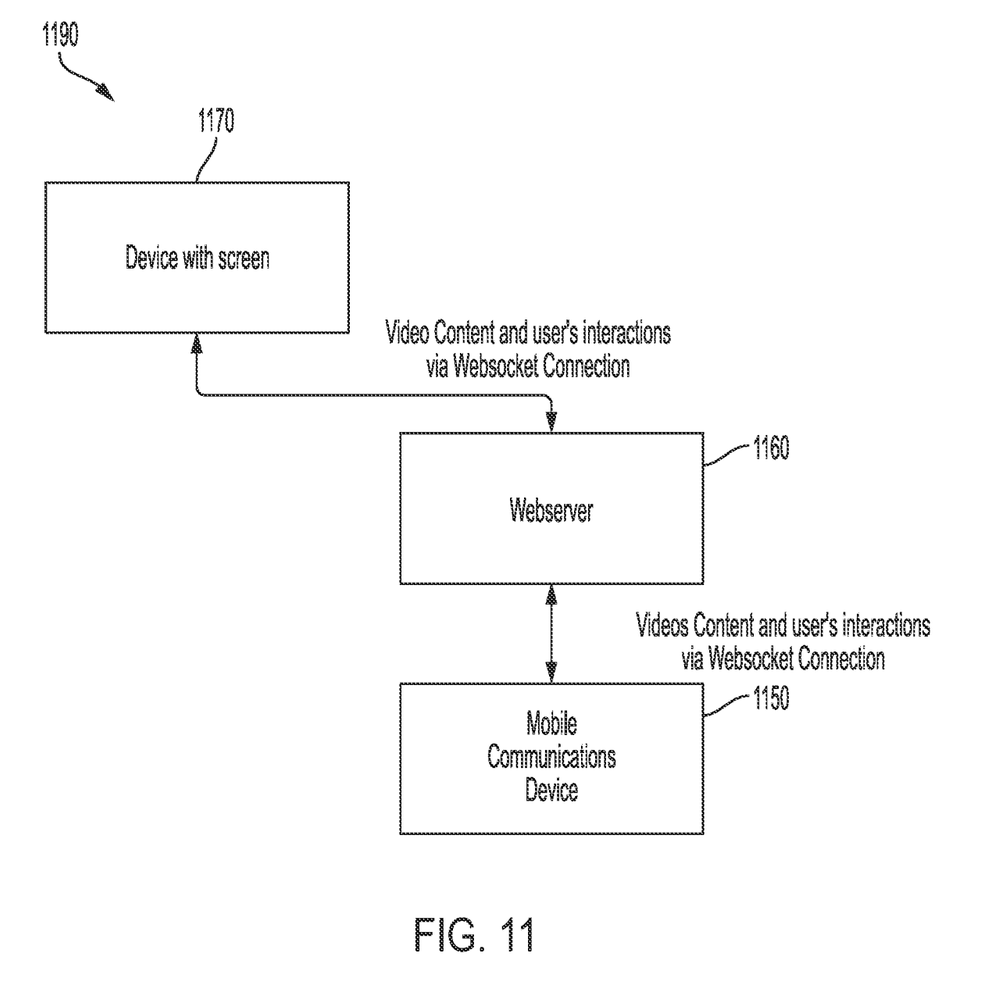
FIG. 11 depicts an example user terminal that includes a built-in Internet-based mobile commands processing unit in accordance with one non-limiting embodiment.

While FIGS. 1-8 generally depict existing user terminals that can be retrofitted with contactless interaction capabilities, this disclosure is not so limited. Referring now to FIGS. 9-11, example embodiments are depicted in which user terminals are manufactured with contactless interaction capabilities similar to the gesture-based and mobile command-based approaches described above.

Referring first to FIG. 9, a user terminal 990 that includes a built-in gesture processing unit 900 in accordance with one non-limiting embodiment is depicted. Similar to the user terminal 190 of FIG. 1, a user can provide input to the user terminal 990 via non-contacting gestures.

At the time of manufacture, the gesture processing unit 900 can be connected to the peripheral modules of user terminal 990. The gesture processing unit 900 can have a gesture recognizer module 906 with a USB output that is to be treated as a peripheral device by the other computers on-board the user terminal 990. The user terminal 990 can also be built with one (or more) depth sensor camera 902 that is connected to the gesture recognizer module 906. The gesture recognizer module 906 can be connected to the primary computer of the user terminal 990 via the USB port such that touch-based devices (touchscreen, keyboard, mouse, etc.) of the user terminal 990 can be replaced with a touchless approach.

An application running on the gesture processing unit 900 can actively monitor for motion via the connected depth camera 902. Upon identifying an "Initiate" gesture, the user terminal 990 can be configured to graphically include a cursor on a device screen 970 to aid the user in gesture-based navigation. As describe above, gestures by the user can be translated by the gesture recognizer module 906 to the equivalent HID (human interface device) commands, delivered to the primary computer via USB connection, and displayed on the screen 970.

Furthermore, while FIG. 9 schematically depicts a camera module 902 having a depth sensor and a gesture recognizer module 906 having a TPU, this disclosure is not so limited. Similar to embodiments provided above, for example, the camera module 902 does not necessarily need to have a depth sensor, nor is a TPU required. As such, in some example embodiments, the camera module 902 can include a depth sensor and a TPU is not used for gesture processing. In other example embodiments, the camera module 902 does not have a depth sensor and a TPU is used gesture processing.

Referring now to FIG. 10, an example user terminal 1090 is depicted that includes a built-in HID/Bluetooth module 1080 allowing for user input from a coupled mobile communications device 1050. Similar to the embodiments described above, the user terminal 1090 can be configured to either receive commands from the mobile communications device 1050 when it is used as a trackpad, or the display of the user terminal 1090 can be mirrored to the mobile communications device 1050 via a local network connection. In particular, the HID/Bluetooth module 1080 can be a microcontroller with Bluetooth or WiFi module that connects as a HID device to the main computer of the user terminal 1090. A user can connect their mobile communication device 1050 to the HID/Bluetooth module 1080 through a Bluetooth-based connection to enable contactless interaction with the user terminal 1090.

Referring now to FIG. 11, an example user terminal 1190 is depicted that includes a built-in Internet-based mobile commands processing unit allowing for a bi-directional connection between a mobile communications device 1150 and the user terminal 1190 via a websocket protocol. As noted above, however, any suitable web-based communication protocol(s) can be utilized. The user terminal 1190 can be configured to allow a user to see a broadcast version of the user terminal 1190 display mirrored on the mobile communications device 1150. Alternatively, the user terminal 1190 can be configured to allow a user to use their mobile communications device 1150 as a touchpad for a display screen 11110 of the user terminal 1190.

When a user approaches the user terminal 1190 in its idle state, an application running on the user terminal 1190 can display an overlay message directing the user to navigate to a specific website address on their mobile communications device 1150. The display screen 1170 can also show a unique QR code or other unique identifier. The user can then navigate to the website address on their mobile communications device 1150 and be prompted to scan the currently displayed QR code from the display screen 1170, or otherwise enter the unique identifier. For example, in some embodiments, a unique alphanumeric code can be displayed on the display screen 1170 of the user terminal 1190 that can be typed into the webpage displayed on the mobile communications device 1150. Once the unique code is entered, a dedicated websocket connection can be established between the mobile communications device 1150 and the user terminal 1190 through a webserver 1160. The display screen 1170 of the user terminal 1190 can be set to display alternative content, display a black screen, or display a message that private connection in session, for example.

In accordance with various embodiments, the user terminal 1190 can utilize a video compression algorithm and only send static images of the screen to the mobile communications device 1150 to minimize the latency and reduce the required bandwidth. The website presented on the mobile communications device 1150 can capture the user's interactions and send them to the web server 1160, which in turn sends them to the user terminal 1190. The user terminal 1190 can translate such interactions to an HID command.

It is noted that user terminals in accordance with the present disclosure can include multiple systems for different types of contactless interaction. By way of example, various user terminals may be retrofitted or manufactured with units that allow users to provide input via gestures (similar to FIGS. 1-3, and 9, for example), or their mobile communications devices (similar to FIGS. 4-8 and 10-11, for example). As such, a user wishing to interact with such user terminal can optionally choose the type of non-contacting user interface they prefer to use.

The processes described herein can be executed by programmable equipment, such as computers or computer systems and/or processors. Software that can cause programmable equipment to execute processes can be stored in any storage device, such as, for example, a computer system (nonvolatile) memory, an optical disk, magnetic tape, or magnetic disk. Furthermore, at least some of the processes can be programmed when the computer system is manufactured or stored on various types of computer-readable media.

It can also be appreciated that certain portions of the processes described herein can be performed using instructions stored on a computer-readable medium or media that directs a computer system to perform the process steps. A computer-readable medium can include, for example, memory devices such as optical disk drives or hard disk drives. A computer-readable medium can also include memory storage that is physical, virtual, permanent, temporary, semi-permanent, and/or semi-temporary.

A "computer," "computer system," "host," "server," or "processor" can be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein can include memory for storing certain software modules used in obtaining, processing, and communicating information. It can be appreciated that such memory can be internal or external with respect to operation of the disclosed embodiments.

In various embodiments disclosed herein, a single component can be replaced by multiple components and multiple components can be replaced by a single component to perform a given function or functions. Except where such substitution would not be operative, such substitution is within the intended scope of the embodiments. The computer systems can comprise one or more processors in communication with memory (e.g., RAM or ROM) via one or more data buses. The data buses can carry electrical signals between the processor(s) and the memory. The processor and the memory can comprise electrical circuits that conduct electrical current. Charge states of various components of the circuits, such as solid state transistors of the processor(s) and/or memory circuit(s), can change during operation of the circuits.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art.

We claim:

1. A gesture processing unit enabling contactless interaction with a casino game having a primary computer and a camera, comprising:
   a video input port;
   a video output port;
   at least one communication port;
   a central processing unit (CPU);
   a gesture recognizer module configured to receive a camera signal from the camera associated with the casino game and provide recognized gestures to the CPU;
   a human interface device (HID) module in communication with the CPU and configured to provide HID commands to the primary computer of the casino game via the communication port based on the recognized gestures; and
   a video overlay module in communication with the CPU and configured to receive source video from the primary computer of the casino game via the video input port and provide a modified video signal to the primary display of the casino game via the video output port based on the recognized gestures, wherein the modified video signal comprises the source video with an overlay of a cursor, wherein movement of the cursor on the primary display of the user terminal is based on the recognized gestures.

2. The gesture processing unit of claim 1, wherein the camera signal comprises depth information.

3. The gesture processing unit of claim 1, wherein the gesture recognizer module comprises a tensor processing unit (TPU).

4. The gesture processing unit of claim 1, further comprising an HDMI to VGA converter.

5. The gesture processing unit of claim 1, further comprising a VGA to HDMI and a HDMI to VGA converter.

6. The gesture processing unit of claim 1, wherein one of the recognized gestures is a hand gesture to initiate gesture-based navigation.

7. A casino game enabling contact-based user interaction and contactless user interaction, comprising:
   a power supply;
   a camera;
   a primary display; and
   a peripheral gesture processing unit installed into the casino game, the gesture processing unit comprising
   a central processing unit (CPU) configured to selectively operate the casino game in a contactless operational mode, the gesture processing unit configured to receive a camera signal from the camera and recognize gestures that are executed within a field of view of the camera; and
   a video overlay module configured to provide a modified video signal to the primary display of the casino game based on the recognized gestures while the casino game is operated in the contactless operational mode, wherein the modified video signal comprises a cursor and wherein movement of the cursor is based on the recognized gestures.

8. The casino game of claim 7, wherein the camera signal comprises depth information.

9. The casino game of claim 7, wherein one of the gestures executed within a field of view of the camera recognized by the CPU is a hand gesture to initiate gesture-based navigation.

10. A method of contactless interaction with a casino game comprising;
    displaying, by a primary computer of a casino game, a video signal on a primary display of the casino game;
    modifying, by a gesture processing unit installed into the casino game, the video signal to include a cursor;
    while a user interacts with the casino game through non-contacting gestures that are executed within a field of view of a camera mounted to a user terminal, receiving, by the peripheral gesture processing unit, a camera signal from the camera;
    detecting, by the gesture processing unit, a recognized hand gesture;
    responsive to detecting the recognized hand gesture, moving, by the gesture processing unit, the position of the cursor on the primary display of the casino game; and
    responsive to detecting the recognized hand gesture, providing, by the gesture processing unit, one or more human interface device (HID) commands to the primary computer of the casino game.

11. The method of contactless interaction with a casino game of claim 10, wherein the gesture processing unit comprises a tensor processing unit (TPU).

12. The method of contactless interaction with a casino game of claim 10, wherein the camera signal comprises depth information.

13. The method of contactless interaction with a casino game of claim 10 wherein the recognized gesture is a hand gesture to initiate gesture-based navigation.

14. A gesture processing unit enabling contactless interaction with a casino game having a primary computer and a camera, comprising:
    a video input port;
    a video output port;

at least one communication port;

a central processing unit (CPU);

a gesture recognizer module configured to receive a camera signal from the camera associated with the casino game and provide recognized gestures to the CPU, wherein at least one of the recognized gestures is a hand gesture to initiate gesture-based navigation;

a human interface device (HID) module in communication with the CPU and configured to provide HID commands to the primary computer of the casino game via the communication port based on the recognition of the hand gesture to initiate gesture-based navigation; and a video overlay module in communication with the CPU and configured to receive source video from the primary computer of the casino game via the video input port and provide a modified video signal to the primary display of the casino game via the video output port subsequent to the recognition of the hand gesture to initiate gesture-based navigation, wherein the modified video signal comprises the source video with an overlay of a cursor, wherein movement of the cursor on the primary display of the user terminal is based on the recognized gestures.

15. The gesture processing unit of claim 14, wherein the camera signal comprises depth information.

16. The gesture processing unit of claim 14, wherein the gesture recognizer module comprises a tensor processing unit (TPU).

17. The gesture processing unit of claim 14, further comprising an HDMI to VGA converter.

18. The gesture processing unit of claim 14, further comprising a VGA to HDMI and a HDMI to VGA converter.

* * * * *